(12) United States Patent
Lee, Jr.

(10) Patent No.: US 9,273,872 B1
(45) Date of Patent: Mar. 1, 2016

(54) WEATHER RESISTANT PORTABLE HEATER

(71) Applicant: Procom Heating, Inc., Brea, CA (US)

(72) Inventor: Joseph B. Lee, Jr., Bowling Green, KY (US)

(73) Assignee: PROCOM HEATING, INC., Brea, CA (US)

( * ) Notice: Subject to any disclaimer, the term of this patent is extended or adjusted under 35 U.S.C. 154(b) by 186 days.

(21) Appl. No.: 13/750,647

(22) Filed: Jan. 25, 2013

Related U.S. Application Data

(60) Provisional application No. 61/590,984, filed on Jan. 26, 2012.

(51) Int. Cl.
*F24D 19/06* (2006.01)
*F24H 3/00* (2006.01)

(52) U.S. Cl.
CPC ............. *F24D 19/06* (2013.01); *F24H 3/006* (2013.01)

(58) Field of Classification Search
CPC ......... F24H 3/025; F24H 9/1881; F24H 3/02; F24H 3/0488; F24D 19/06
USPC ...................................... 126/58, 60, 61, 39 R
See application file for complete search history.

(56) References Cited

U.S. PATENT DOCUMENTS

| | | | |
|---|---|---|---|
| 3,092,095 A | | 6/1963 | Hottenroth et al. |
| 3,393,903 A | * | 7/1968 | Berglund, Jr. ......... F24H 3/0488 432/223 |
| 3,645,512 A | * | 2/1972 | Dent et al. ..................... 432/223 |
| 4,313,417 A | | 2/1982 | Briggs et al. |
| D264,374 S | | 5/1982 | Briggs et al. |
| 4,443,187 A | | 4/1984 | Shaftner et al. |
| 4,532,914 A | * | 8/1985 | Thomas et al. ............ 126/110 C |
| 4,546,412 A | * | 10/1985 | Nakazawa et al. ............ 361/743 |
| 5,893,711 A | * | 4/1999 | Vogelzang et al. ............ 432/222 |
| 6,142,141 A | | 11/2000 | Long |
| 6,880,549 B2 | | 4/2005 | Topp |
| 2003/0015536 A1 | * | 1/2003 | Tekulve et al. ................ 220/562 |
| 2008/0260364 A1 | * | 10/2008 | Vandrak et al. ................ 392/365 |

* cited by examiner

*Primary Examiner* — Alissa Tompkins
*Assistant Examiner* — Benjamin W Johnson
(74) *Attorney, Agent, or Firm* — Middleton Reutlinger

(57) ABSTRACT

An elongated housing of a portable forced air unit is provided with a combustion chamber located therein. One or more side covers of the controls compartment protects the compartment from weather or more specifically water related damage or malfunction. The one or more side covers direct external water away from the controls compartment and may also direct internal water within the controls compartment away from electronic devices contained therein. A successive higher overlapping of the housing, one or more side covers, and the fuel tank assembly may cascade external water away from the unit.

15 Claims, 5 Drawing Sheets

WEATHER RESISTANT PORTABLE HEATER

CROSS-REFERENCE TO PRIOR APPLICATION

This application claims priority to and benefit under 35 U.S.C. 119(e) to currently U.S. Provisional Application Ser. No. 61/590,984, filed on Jan. 26, 2012, which is incorporated herein by reference.

TECHNICAL FIELD

The present invention relates to portable space heaters in particular to a weather resistant portable space heater.

DETAILED DESCRIPTION

Figure 1:
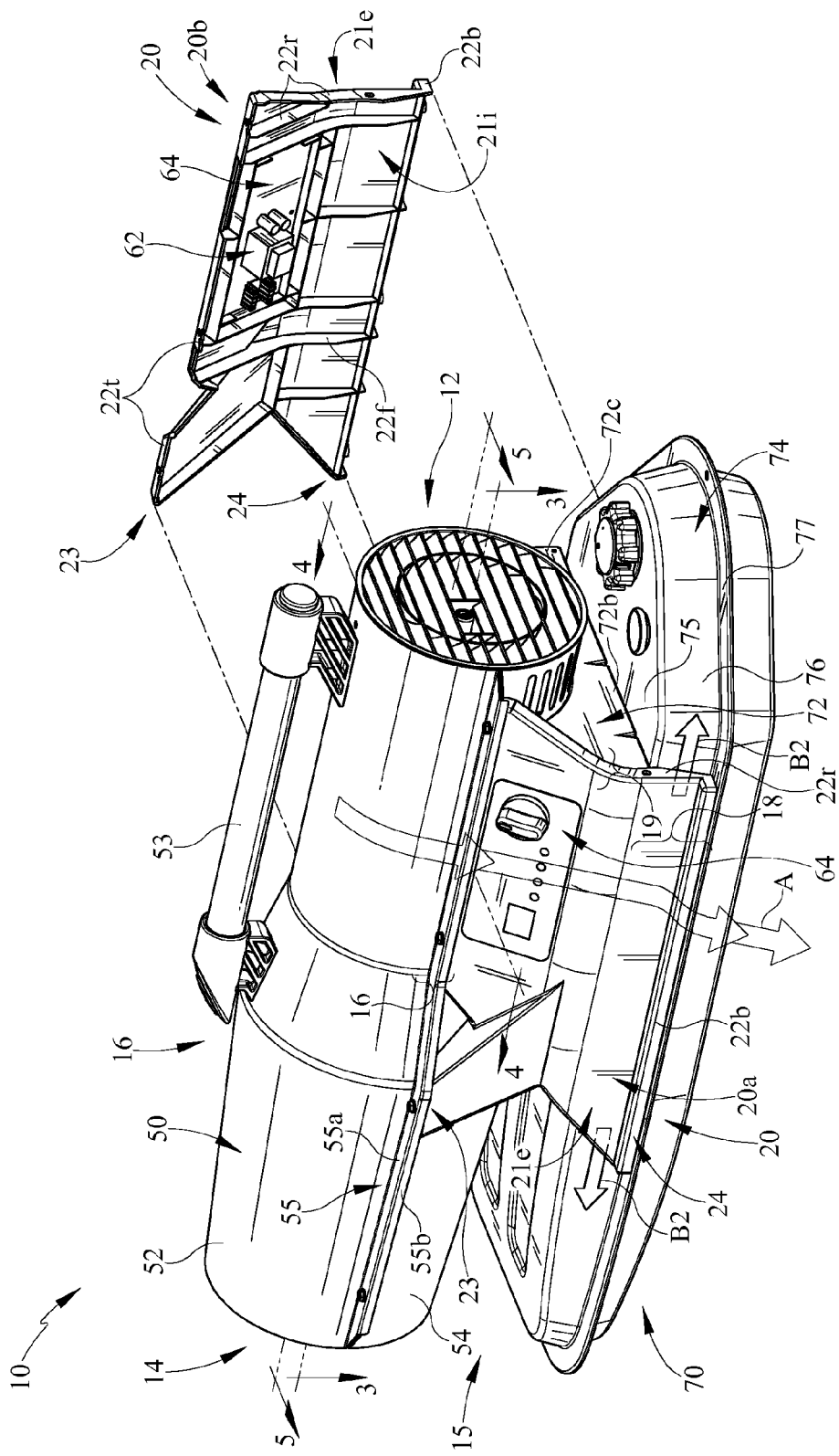
FIG. 1 is a rear perspective view of a portable forced air heating unit according to one embodiment with the left side cover exploded away.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

The portable forced air heating unit 10 depicted in the drawings provides for a weather resistant controls compartment capable of withstanding external and internal water that would typically cause malfunction and/or severe damage to the components of the unit. Unit 10, with one or more side covers, effectively directs exterior water away from the controls compartment and/or may direct interior water away from the electronic devices of the controls compartment to ensure a substantially safe operating condition.

Kerosene forced air heaters conventionally include a housing, a burner head assembly mounted within the housing, and an air blower system within the housing behind the burner head assembly. Fuel (kerosene, fuel oil, diesel fuel, etc.) is conveyed to the burner head assembly and combustion chamber. The blower supplies combustion air to the burner head assembly and forces hot combustion gases from the burner head assembly while cooling the exterior of the burner head assembly and combustion chamber. Although a kerosene forced air heater is shown in detail it is understood that the embodiments of the invention may be used in any type of portable forced air heater such as, but not limited to, a gas or multi-fuel forced air heater.

Figure 4:
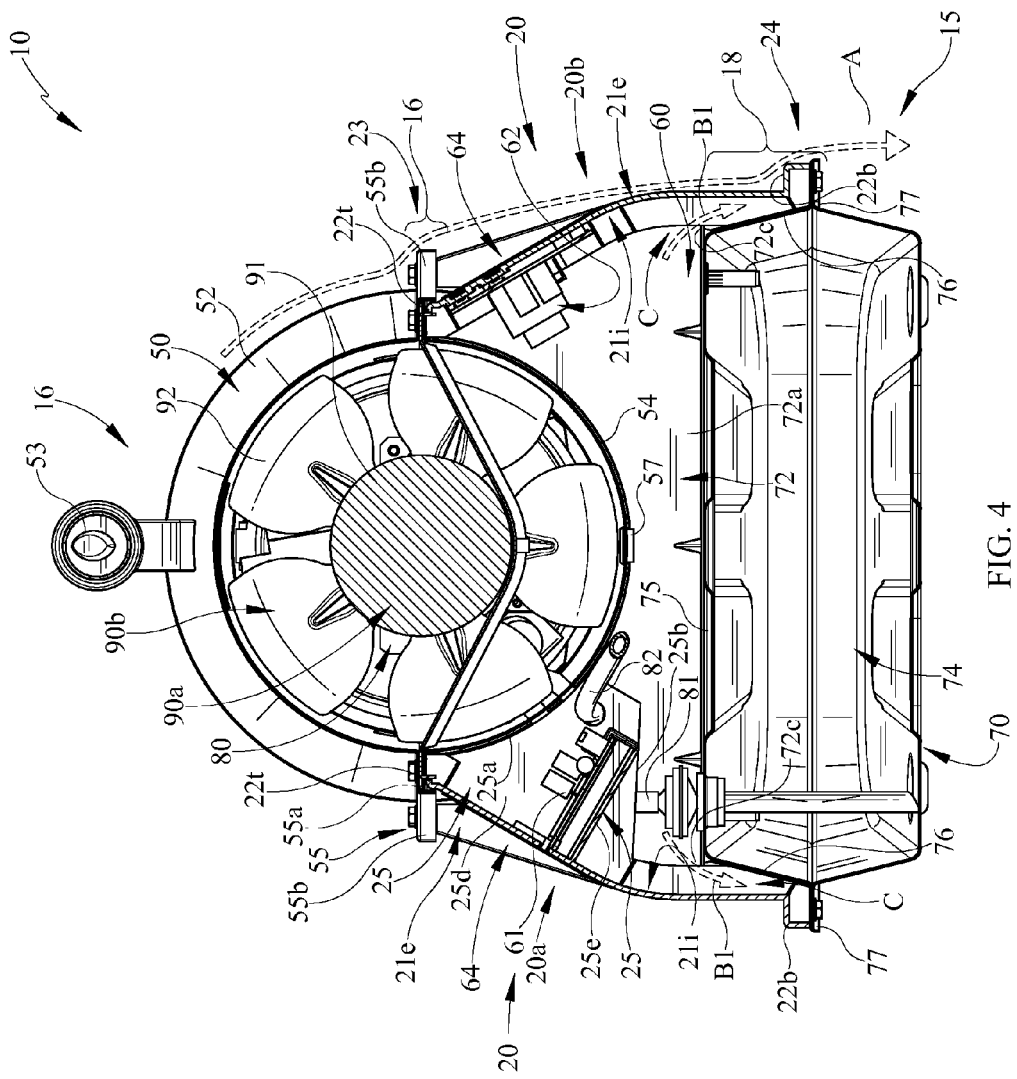
FIG. 4 is a sectional view of the heating unit of FIG. 1 along line 4-4 to reveal the interior of the controls compartment.
Figure 5:
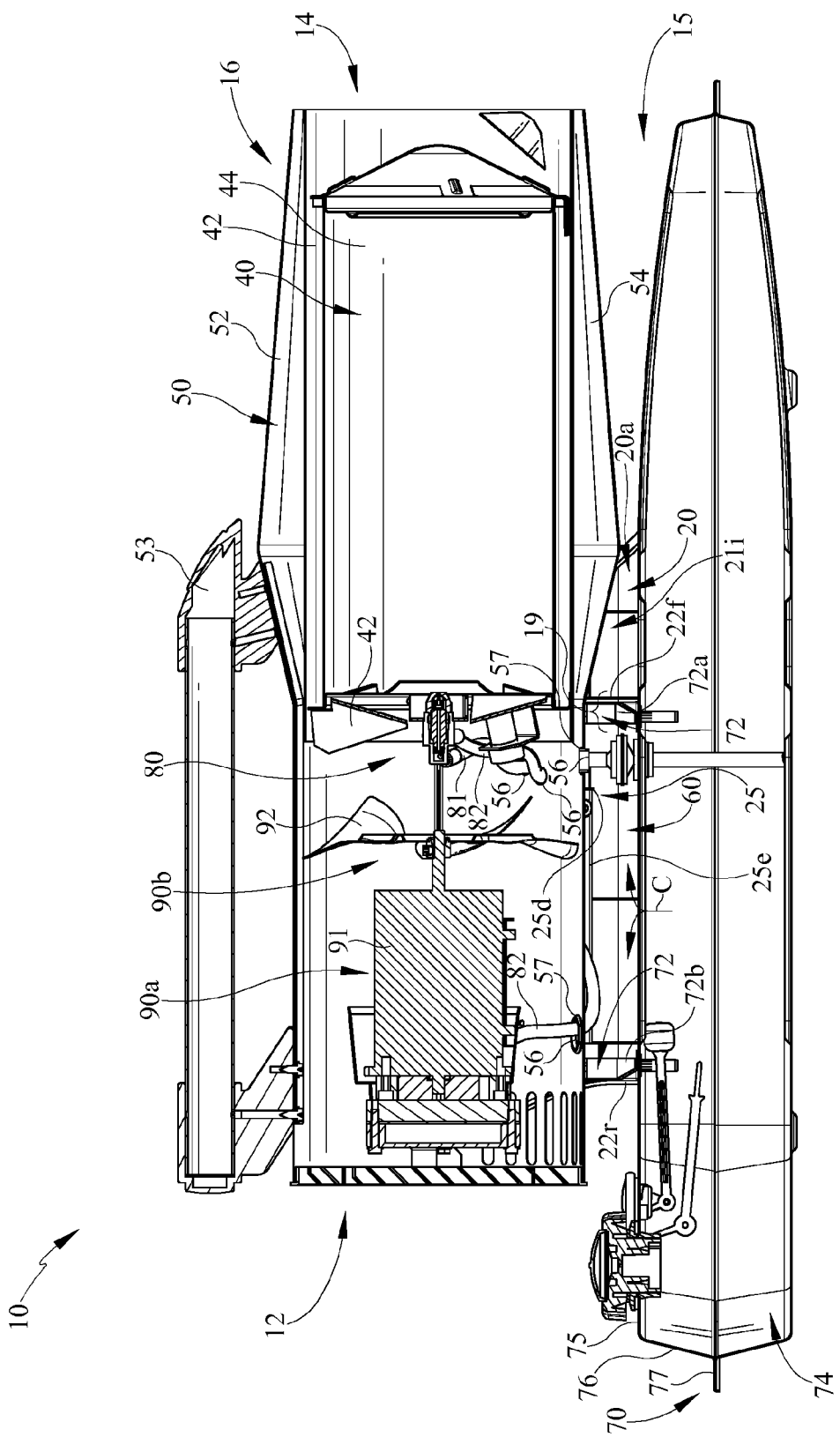
FIG. 5 is a sectional view of the heating unit of FIG. 1 taken along line 5-5.

Typically in operation, but not limited thereto, kerosene forced air heating unit 10 as shown in FIGS. 1-5 has a fuel tank assembly 70 in fluid communication with the burner head assembly 80 through a fuel line 81. Burner head assembly 80 includes an air line 82 in fluid communication with the motor and pump assembly 90a. A motor 91 of the motor and pump assembly 90a drives a fan 92 of the fan assembly 90b to draw air from the back of the unit or inlet end 12 in order to circulate or push air into and around a combustion chamber assembly 40 (FIG. 5). Combustion chamber assembly 40 may include a combustion chamber 44 and a heat shield 42 surrounding the chamber 44. Air may be circulated through a rear plate 42 (FIGS. 3 and 5) when entering combustion chamber assembly 40. The air is heated and provides a stream of clean, hot air out of an exit or outlet end 14 of unit 10. Air circulated between the combustion chamber assembly 40 and housing 50 cools the burner head assembly 80, combustion chamber assembly 40, and housing 50. Additional components may be included within the scope of the embodiments such as the type shown in U.S. application Ser. No. 12/186,110 filed Aug. 5, 2008 and entitled LOW PRESSURE FORCED AIR HEATER, which is herein incorporated by reference.

During normal thermostatic operation, unit 10 will cycle off when the air temperature in the surrounding environment rises to the thermostat setting. When the air temperature drops sufficiently below the thermostat setting, the electric motor and pump assembly 90a and fan assembly 90b within unit 10 will begin to run. Subsequently, burner head assembly 80 is caused to ignite and provide heat to maintain the temperature setting. In addition, a handle 53 for carrying unit 10 may be attached and positioned on a top side 16 of housing 50. Even though controls compartment 60 and carrying handle 53 are shown in detail, any number of controls compartments or handles may be orientated, sized, constructed, and positioned in any manner. For instance, a handle or multiple handles may be oriented on the top, bottom, front, rear, side, or on any combination of surfaces of unit 10. Handle 53 placement may depend on a specific ergonomic position related to the center of mass of unit 10, because the unit may be of a variety of different sizes and lengths.

As shown in FIGS. 1-5, unit 10 includes an elongated housing 50. Although housing 50 may be formed as one piece of sheet metal formed to produce the shape of the housing, it is shown in the figures as being made from a plurality of sections of sheet metal. Housing 50 may have a housing upper shell 52 and a housing lower shell 54 longitudinally extending between inlet end 12 and outlet end 14. Housing 50 is not limited to being formed of metal. Housing 50 may be a variety of different shapes such as cylindrical, sizes, configurations, and still be within the scope of the embodiments. Housing 50 surrounds burner head assembly 80 whereby combustion chamber assembly 40 is concentrically aligned with burner head assembly 80 within the housing. Air is drawn from the surrounding environment through inlet end 12 of housing 50, heated, and then forced out of outlet end 14 to heat the surrounding environment. Located on the bottom side 15 of unit 10, below housing 50, is one or more of the heater's control circuitry or electronic devices located, fully or partially, within a controls compartment 60. Controls compartment 60 may be at least partially defined by one or more side covers 20, housing 50, fuel tank assembly 70, one or more housing support brackets 72, or combinations thereof. It is understood that the controls compartment may be defined by other structure of the unit. It should also be understood that the controls compartment 60 may be located or mounted in any number of positions and be a variety of dimensions, shapes, quantities, and construction. It is understood that the a variety of components, not limited to electronic devices, may be located or mounted but not limited to any number of positions within the controls compartment 60 or to one or more of the side covers 20. For instance, a main PCB assembly 61 is shown as mounted to a right side cover 20a. A thermostat 62 may also be included in the control circuitry of unit 10 and mounted to a left side cover 20b whereby the user will be able to adjust the thermostat to the desired temperature. The user therefore has convenient access to controls of the control panel 64 and other electronic devices relative to the side covers 20. In addition, controls compartment 60 may also contain, or portions of, the solenoid valve, automatic control valve, DSI or high voltage ignitor, and injector. Controls compartment 60 may also include the connection for a power cord.

As shown in FIGS. 1-5, side covers 20 define at least partially controls compartment 60. Side covers 20 may be made from, but not limited to, plastic, metal, or combinations thereof. Right and left side covers 20a, 20b, respectively, each include an exterior side 21e and an opposing interior side 21i facing towards the inside of controls compartment 60. A top flange 22t extends substantially horizontally along an upper edge 23 of each side cover 20 and a bottom flange 22b may also extend substantially horizontally along a lower edge 24 of each side cover. Between side cover top flange 22t and side cover bottom flange 22b extends a substantially vertical front and rear flange 22f, 22r, respectively. It should be understood one or more of the flanges may be a variety of shapes, sizes, locations, construction, and quantities and still be within the scope of the embodiments herein. For example front flange 22f is not positioned on the leading edge of each side cover 20 but is inwardly spaced therefrom. One or more dividers or panels 25 may separate the compartment into multiple compartments or sections. As shown on the right side cover 20a, but not limited to that specific side cover, one or more dividers or panels 25 may extend from the interior side 21i of side cover 20. As shown in FIGS. 2-5, one such divider 25d is positioned perpendicular to and vertical relative to the interior side 21i of side cover 20a. Divider 25d includes an upper edge 25a abutting housing 50 and thus is shaped or curved to the exterior surface of lower shell housing 54. A lower edge 25b may connect and depend past the PCB assembly mounting divider 25e that extends from interior side 21i of the side cover 20. It should be understood that a variety of components of unit 10 such as, but not limited to, housing support brackets 72 and/or housing 50 may also be used in combination with the side covers 20 or dividers 25 to create multiple sections or compartments within controls compartment 60.

Although one or more dividers 25 are shown in detail in the drawings, it is merely representative of one embodiment, and it is to be understood that there are a variety of shapes, orientations, constructions, and quantities which may be used and still be within the scope of this embodiment. For example, one or more dividers may interconnect left side cover 20b to right side cover 20a. As another example, one or more dividers could create a front, back, or a variety of distinct sections of the controls compartment. Any number of different configurations of dividers may be used to function within the unit 10 such as, but not limited to, directing internal water and reducing water related malfunction or damage.

Further, although side covers 20 are shown in detail in the drawings, they merely represent one embodiment, and it is to be understood that there are a variety of shapes, quantities, positions, compositions, and constructions which may be used and still be within the scope of these embodiments.

One or more side covers 20 may be able to expel water away from controls compartment 60, as well as may expel water from within the controls compartment 60, by directing water to predetermined locations or directions within or from unit 10. In use, to expel water coming in contact with the exterior of the unit 10; the housing 50, side cover 20, and fuel tank assembly 70 are laid in overlapping rows with each partially covering the structure above it. As exaggerated with directional arrow A in FIGS. 1 and 4, as water flows down the unit 10 it runs from the exterior of housing 50 across exterior side 21e of side cover 20 until it reaches the exterior of tank 74 and runs off. These overlapping rows may include, but is not limited to, a top overlap section 16 and a bottom overlap section 18. The top overlap section 16 includes housing 50 with a longitudinal flange 55 overlapping upper edge 23 of side cover 20. At the junction between the upper and lower shells 52, 54, respectively, housing longitudinal flange 55 has a substantially horizontal flange portion 55a with its distal free end having a depending substantially vertical flange portion 55b. The housing horizontal flange portion 55a directly abuts top flange 22t of side cover 20 and the housing vertical flange portion 55b directly abuts the exterior side or surface 21e of side cover 20. This vertical overlap of the top overlap section 16 between the housing vertical flange portion 55b and the side cover exterior surface 21e reduces the likelihood that water will penetrate upwards against gravity between the side cover and housing and continue across the horizontal overlap of the housing horizontal flange portion 55a and the side cover top flange 22t. The bottom overlap section 18 includes side cover 20 depending a distance vertically past the tank top wall 75 of tank 74. Again, water inclines not to flow upward between the vertical overlap of side cover 20 and depending sidewall 76 of tank 74. As shown in this embodiment, side cover 20 extends past tank top wall 75 for a predetermined distance to tank flange 77 thereby side cover bottom flange 22b directly abuts horizontal tank flange 77. As a result of the successive higher overlapping sections at the top and bottom overlap sections 16, 18, respectively, of the housing 50, the one or more side covers 20, and fuel tank assembly 70, water cascades away from unit 10 and more specifically away from controls compartment 60 and the potentially water sensitive electrical devices contained therein. Further, control panels 64 may also cascade water from the side cover 20 and as such be weather resistant in a variety of embodiments, but not limited to, the panel's connection to the side cover, the panel's exterior surface, and the user and electrical interfaces associated with the control panel.

As shown in FIGS. 1-5, front and rear flanges 22f, 22r, respectively, of the side covers 20 also have an overlap section 19 at the corresponding front and rear housing support brackets 72a, 72b and may also expel water away from unit 10. Side cover front flange 22f overlaps an exterior surface of front housing support bracket 72a. Side cover rear flange 22r overlaps the exterior surface of rear support bracket 72b. The overlapping section 19 of front and rear flanges 22f, 22r with the support brackets 72 prevents water from entering controls compartment 60 at the forward and rearward ends of controls compartment 60 or unit 10.

Figure 2:
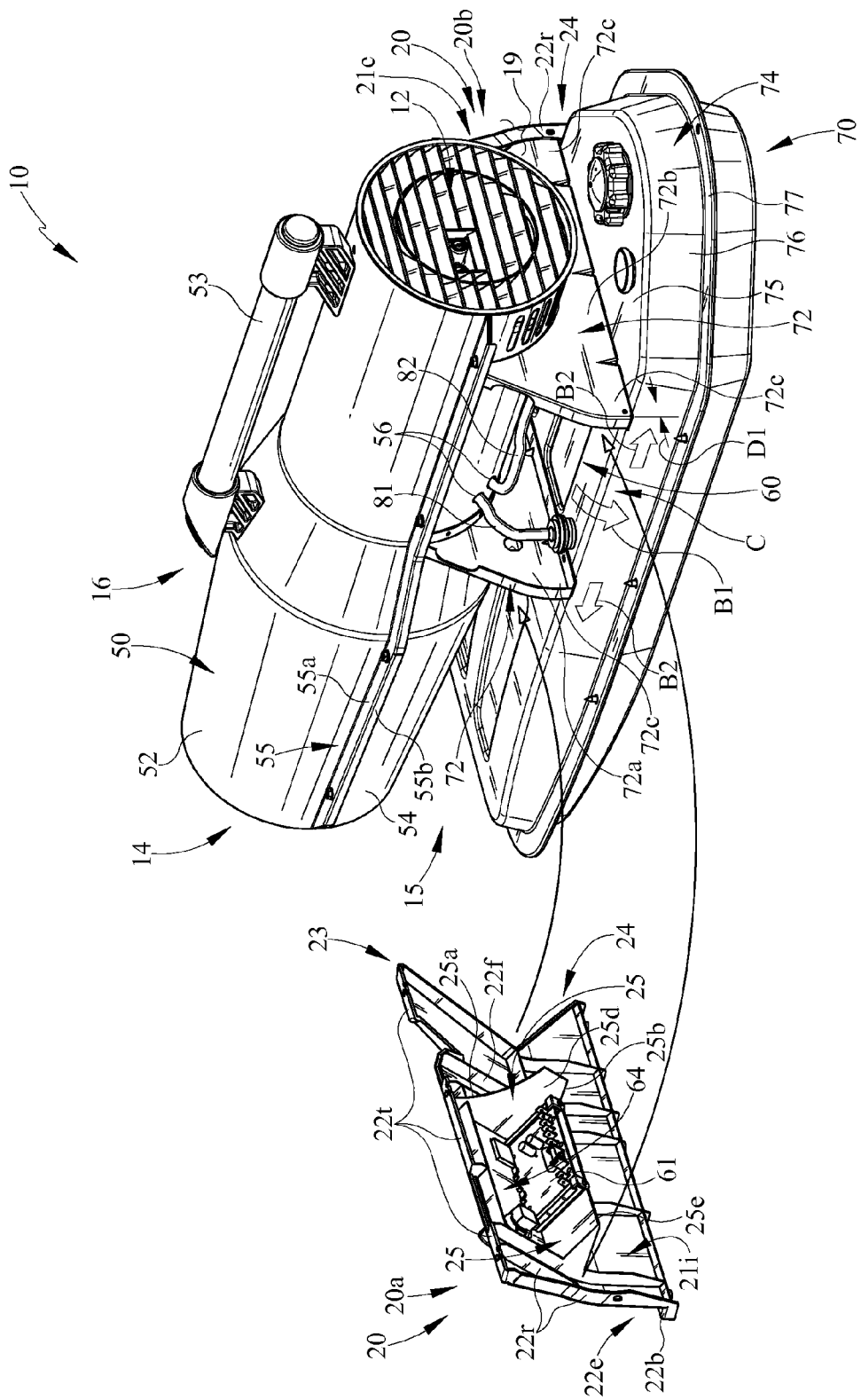
FIG. 2 is a rear perspective view of the heating unit of FIG. 1 with the right side cover exploded away.
Figure 3:
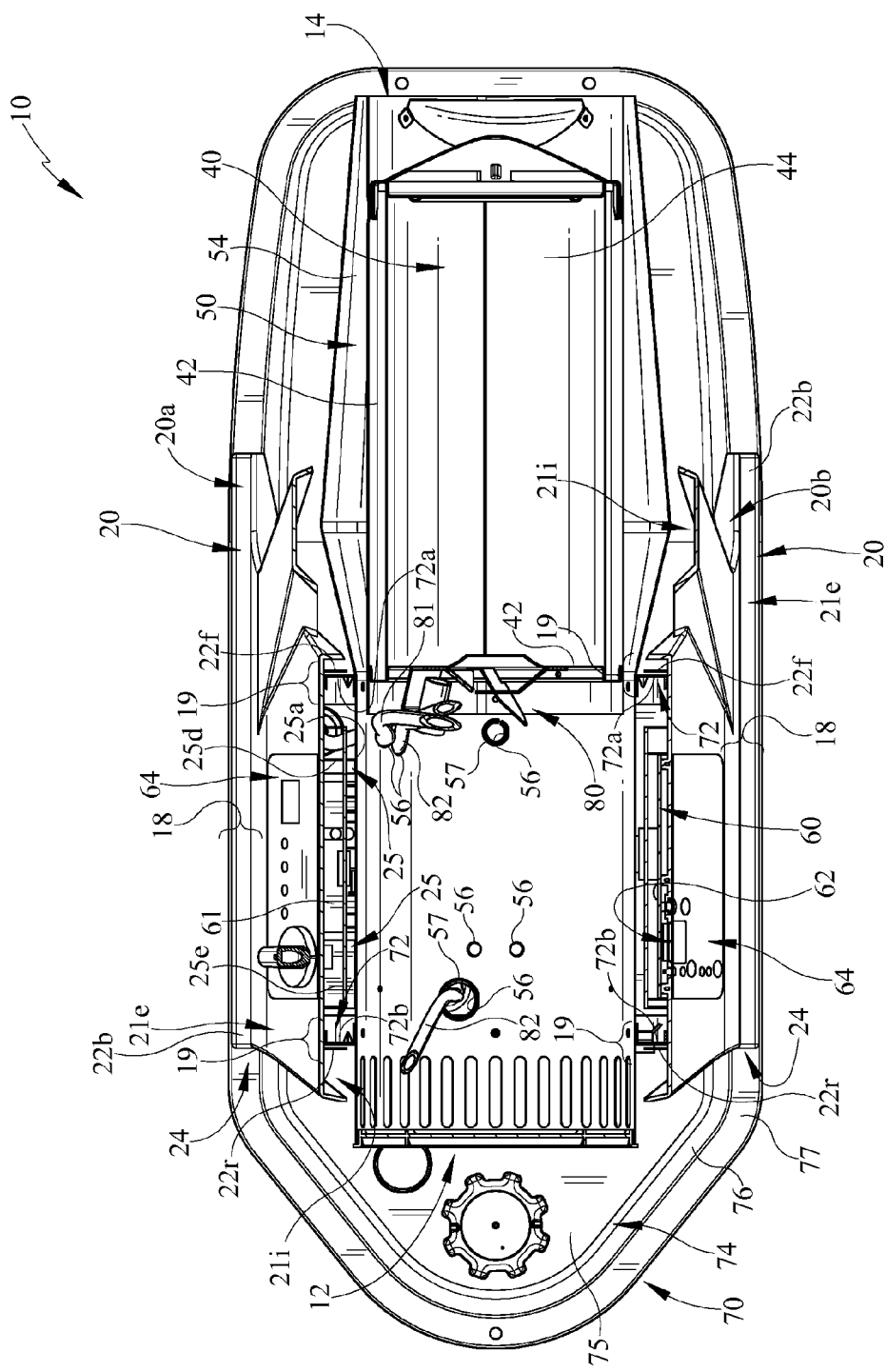
FIG. 3 is a sectional view of the heating unit of FIG. 1 taken along line 3-3 with the motor, pump, fan, and burner assemblies removed or at least partially removed to reveal the interior of the housing lower shell and the assembled side covers.

As shown in FIGS. 2, 4, and 5, to expel water from within the interior of the unit 10, a fluid overflow passageway or channel C is defined between side cover 20 and fuel tank assembly 70. Front and rear housing supports or support brackets 72a, 72b, respectively, mount the housing 50 above fuel tank assembly 70 and also extend laterally past the lateral extent of tank top wall 75. More specifically, an arcuate edge of each support bracket receives the cylindrical housing 50. As a result of these laterally extending ends 72c of each housing support bracket 72, interior side 21i of side cover 20 is spaced a distance D1 from tank assembly 70. The distance D1 spacing the side cover 20 from the tank assembly 70 creates overflow passageway C. Undesirable water accumulating in controls compartment 60 could rise to a level that would come in contact with the electronic devices causing failure. Instead of water filling up controls compartment 60, interior water would flow out the overflow passageway C shown as exaggerated directional arrows B1 and B2 (FIGS. 1, 2, and 4). Overflow passage C allows water to pass off tank top wall 75 and over the depending sidewall 76 of the tank 74 in the direction B1. The overflow water then can pass laterally in opposing longitudinal directions B2 towards the rearward and forward ends of unit 10 between the tank sidewall 76 and side cover 20 or could continue downwardly between the side cover bottom flange 22b and the tank flange 77.

Further when unit 10 is operating, water within the unit may be forced out outlet end 14 of the housing 50 with circulated air. However, water may also be forced through one or more openings 56 of the housing 50 or controls compartment 60 alone or in combination with the outlet end 14 of housing 50. As shown in FIGS. 2-5, one or more dividers 25 may be used to deflect or direct combined forced air and water exiting through openings 56 that connect housing 50 and controls compartment 60. One embodiment of directing or deflecting fluid flow within the unit 10, is one or more side cover dividers 25 that are positioned between main PCB assembly 61 and openings 56 of housing 50 that contain fuel line 81 and air line 82 therethrough (FIG. 2-5). Upon air and water being forced through openings 56 during unit 10 operation, divider 25 deflects or blocks the water from undesirably contacting and thus damaging the main PCB assembly 61 or other electronic devices. It should be understood that the dividers may be in any number of positions, quantities, shapes, sizes, and construction relative to the through openings or electronics and still direct undesirable water. It should also be understood to advantageously position openings 56 entering controls compartment 60 in predetermined locations to minimize the likelihood of water being directly or indirectly forced in undesirable directions. For instance, one or more openings 56 could be positioned centrally on the housing if electronic devices are positioned on the lateral sides adjacent the side covers 20. Further, if the one or more openings 56 are positioned on one side of the controls compartment then the electronic devices could be placed on the opposite side to avoid the forced air and water mixture. Also shown in FIGS. 3-5, one or more through openings 56 may also contain grommets or bushings 57. Bushing 57 may have a larger thickness than the thickness of the housing wall, as a result the grommet wall would extend upwardly from the interior surface of the housing lower shell 54. As such, the added thickness of the grommet wall would function as a weir or dam and retain water within the housing lower shell 54 thereby preventing water to drain through the openings 56 into the controls compartment 60 and possibly cause undesirable water damage or malfunction to the electronic devices.

It is understood that while certain embodiments of the invention have been illustrated and described, it is not limited thereto except insofar as such limitations are included in the following claims and allowable functional equivalents thereof.

I claim:

1. A weather resistant heating system comprising:
   a housing having an inlet end and an outlet end, and one or more openings positioned between said inlet end and said outlet end;
   a combustion chamber positioned within said housing;
   a fuel tank;
   a side cover;
   one or more electronic devices;
   a controls compartment at least partially defined by said side cover and said housing, wherein said one or more electronic devices are positioned within said controls compartment;
   said side cover includes one or more dividers extending into said controls compartment from an interior side of said side cover towards said housing, wherein said one or more dividers subdivide said controls compartment into a first compartment and an adjacent second compartment, wherein said first compartment is in fluid communication with at least one of said one or more openings of said housing and said second compartment contains said one or more electronic devices, wherein said one or more dividers deflect air and water being forced through said one or more openings of said housing into said first compartment of said controls compartment away from said one or more electronic devices of said second compartment; and
   wherein said housing has a first overlapping engagement outwardly from said side cover thereby cascading water from said housing onto said side cover, and wherein said side cover includes a second overlapping engagement outwardly from said fuel tank wherein said side cover extends lower than a top wall of said fuel tank thereby cascading water from said side cover past said top wall of said fuel tank.

2. The weather resistant heating system as in claim 1 further comprising at least one bushing engaging at least one of said one or more openings of said housing, wherein said at least one bushing extends inwardly from an interior surface of said housing.

3. The weather resistant heating system as in claim 1 wherein said housing overlaps an outward facing substantially vertical surface of an upper edge of said side cover.

4. The weather resistant heating system as in claim 3 wherein a lower edge of said side cover overlaps an outward facing substantially vertical sidewall of said fuel tank.

5. The weather resistant heating system as in claim 1 wherein at least one of said one or more dividers is both substantially perpendicular to said side cover and substantially vertical.

6. A weather resistant heating system comprising:
   a housing having an inlet end and an outlet end, and one or more openings positioned between said inlet end and said outlet end;
   a combustion chamber positioned within said housing;
   a blower positioned within said housing and upstream of both said combustion chamber and said one or more openings of said housing;
   a fuel tank;

one or more side covers;
one or more electronic devices;
a controls compartment at least partially defined by said one or more side covers and said housing, wherein said controls compartment is in fluid communication with said housing through said one or more openings, and said one or more electronic devices is positioned in said controls compartment;
at least one of said side covers includes one or more dividers extending into said controls compartment from an interior side of said side at least one cover towards said housing, and said one or more dividers is located between said one or more openings of said housing and said one or more electronic devices to deflect air and water being forced through said one or more openings of said housing into said controls compartment away from said one or more electronic devices; and
wherein said housing has a first overlapping engagement with an exterior surface of at least one of said side covers thereby cascading water from said housing onto said at least one side cover exterior surface, and wherein said at least one side cover includes a second overlapping engagement with a respective side of said fuel tank wherein said at least one side cover extends lower than a top wall of said fuel tank thereby cascading water from said at least one side cover past said top wall of said fuel tank.

7. The weather resistant heating system of claim 6, wherein one or more dividers subdivide said controls compartment into a first compartment unsealed from a second compartment, wherein said first compartment is in fluid communication with said one or more said openings and said second compartment includes said one or more electronic devices.

8. The weather resistant heating system of claim 6 wherein at least one of said one or more dividers includes a first edge and an opposing second edge, wherein said first edge substantially contours to said housing adjacent said one or more openings and said second edge is outwardly spaced away from said housing.

9. The weather resistant heating system of claim 6 wherein said blower is a fan.

10. The weather resistant heating system of claim 6 wherein said one or more openings pass a fuel line or an air line therethrough.

11. A weather resistant heating system comprising:
a housing having an inlet end and an outlet end, and one or more openings positioned between said inlet end and said outlet end;
a combustion chamber positioned within said housing;
a fuel tank;
one or more support brackets supporting said housing above said fuel tank;
one or more side covers;
a controls compartment defined by said fuel tank, said housing, said one or more support brackets, and said one or more side covers, wherein said controls compartment includes a first compartment unsealed from an adjacent second compartment, wherein said first compartment is in fluid communication with said housing by said one or more openings within said housing and said second compartment includes one or more electronic devices;
wherein at least one of said one or more side covers includes at least one divider between said first compartment and said second compartment to deflect forced air and water entering said first compartment of said controls compartment through said one or more openings away from said second compartment of said controls compartment, wherein said at least one divider extends from an interior side of said at least one side cover towards said housing; and
wherein said housing has a substantially vertical overlapping engagement with an exterior surface of at least one of said one or more side covers thereby cascading water from said housing onto said at least one side cover exterior surface, and wherein said at least one side cover includes a substantially vertical overlapping engagement with a respective side of said fuel tank wherein said at least one side cover extends lower than a top wall of said fuel tank thereby cascading water from said at least one side cover past said top wall of said fuel tank.

12. The weather resistant heating system of claim 11 wherein said at least one divider includes a first edge abutting said housing between said one or more openings of said housing and said one or more electronic devices.

13. The weather resistant heating system of claim 12 wherein said first edge of said at least one divider contours to an exterior surface of said housing.

14. The weather resistant heating system as in claim 11 wherein an overflow passageway between at least one of said one or more side covers and said fuel tank allows water to overflow away from a top wall of said fuel tank.

15. The weather resistant heating system as in claim 14 wherein said overflow passageway includes one or more lateral openings extending between said at least one side cover and said fuel tank below said top wall of said fuel tank.

* * * * *